April 19, 1949.　　　L. R. LUDWIG ET AL　　　2,467,760
CIRCUIT INTERRUPTER

Original Filed Nov. 11, 1942　　　　　　　　7 Sheets-Sheet 2

WITNESSES:
E. A. M'Linley
W. R. Crout

INVENTORS
Leon R. Ludwig,
Benjamin P. Baker & Winthrop M. Leeds
BY
Ralph H. Swingle
ATTORNEY April 19, 1949.  L. R. LUDWIG ET AL  2,467,760
CIRCUIT INTERRUPTER Original Filed Nov. 11, 1942  7 Sheets—Sheet 3

WITNESSES:
E. A. McCloskey
W. R. Crout

INVENTORS
Leon R. Ludwig, Benjamin P. Baker
and Winthrop M. Leeds.
BY
Ralph H. Swingle
ATTORNEY

INVENTORS
Leon R. Ludwig, Benjamin P. Baker
and Winthrop M. Leeds.

April 19, 1949.   L. R. LUDWIG ET AL   2,467,760
CIRCUIT INTERRUPTER

Original Filed Nov. 11, 1942   7 Sheets-Sheet 6

WITNESSES:
E.A. M⁠cCloskey.
W. R. Crout

INVENTORS
Leon R. Ludwig, Benjamin P. Baker
and Winthrop M. Leeds.
BY
Ralph H. Swingle
ATTORNEY Patented Apr. 19, 1949

2,467,760

UNITED STATES PATENT OFFICE 2,467,760

CIRCUIT INTERRUPTER

Leon R. Ludwig, Wilkinsburg, Benjamin P. Baker, Turtle Creek, and Winthrop M. Leeds, Wilkinsburg, Pa., assignors to Westinghouse Electric Corporation, East Pittsburgh, Pa., a corporation of Pennsylvania Original application November 11, 1942, Serial No. 465,244. Divided and this application December 22, 1945, Serial No. 636,940

18 Claims. (Cl. 200—150)

This invention relates to circuit interrupters, and, more particularly, to arc extinguishing structures therefor. This application is a division of our copending application, Serial No. 465,244, filed November 11, 1942, now United States Patent 2,406,469, issued August 27, 1946, and assigned to the assignee of the instant application.

More specifically our invention relates to a novel structure for effecting the very rapid extinction of electric arcs drawn in circuit interrupters. It is particularly applicable to the interruption of high voltage arcs, such as those drawn in a 287 kv. circuit, and will effect their interruption in less than one cycle. Our invention is, however, not limited in its application only to high voltage circuits. It is also applicable on low voltage circuits, but merely for purposes of illustration it is described in the specification in a preferred embodiment as used on a high voltage circuit.

Extensive experimental investigation has clearly demonstrated that a rapid lowering of the dielectric strength of an arc extinguishing fluid, such as oil, occurs after it impinges upon the arc stream. It is therefore desirable to eliminate such contaminated fluid as quickly as possible, and to subject the arc stream to the action of fresh fluid of high dielectric strength. It is one of the objects of our invention to provide an arc extinguishing structure which makes full use of this fact.

Another object is to provide an improved arc extinguishing structure which will direct a plurality of spaced jets of arc extinguishing fluid to the arc and will permit the venting of such jets at a number of spaced intermediate points along the arc.

Another object is to provide an improved arc extinguishing structure which directs a plurality of radially inwardly flowing streams of fluid against the arc, changes the direction of flow to one which is longitudinal of the arc, and then provides a plurality of radially outflowing discharge streams which are substantially perpendicular to the arc.

Another object is to provide an improved arc extinguishing structure which will produce both a pressure-generating arc and an interrupting arc, the pressure-generating arc causing a plurality of inwardly flowing streams to converge on the interrupting arc. Preferably the direction of flow of the inwardly flowing streams is changed to a direction which is longitudinal of the arc, and a plurality of venting passages are provided for the rapid venting of contaminated fluid.

A further object of our invention is to provide improved operating means for effecting simultaneous action of the contacts in a number of serially related arc extinguishing units.

Another object is to provide improved operating means for effecting simultaneous contact motion in a circuit interrupter of the type which bridges two arc extinguishing units in the closed-circuit position, each of said units having pressure-generating contacts and interrupting contacts.

A further object is to provide a resilient connection between our improved operating means and the moving contacts to obtain the requisite contact pressure in the closed-circuit position of the interrupter.

Another object is to control the division of voltage between the pressure-generating break and the interrupting break in an arc extinguishing unit of the two-break type.

A further object is to obtain substantially equal voltage division among a plurality of arc extinguishing units of a circuit interrupter of the multiple-unit type during the opening and closing operations.

Another object is to provide a low enough impedance means, which may be either resistive or capacitive, shunting at least two cooperating contacts of a circuit interrupter to decrease the rate of rise of the recovery voltage transient across said contacts during the opening operation to insure that there will be no restriking of the extinguished arc.

Another object is to apply such impedance means mentioned in the immediately preceding paragraph to a circuit breaker of the multiple-unit type to prevent the restriking of the extinguished arcs.

A further object is to provide a low enough impedance means, which is preferably resistive, shunting at least two cooperating contacts of a circuit interrupter to damp the recovery voltage transient to such an extent that there will be no restriking of the extinguished arc during the opening operation.

Another object is to provide an operating means for the contacts of an arc extinguishing unit of the type which produces both a pressure-generating arc and an interrupting arc such that the speed of opening and closing of one set of contacts in the unit with respect to the other set of contacts in the unit can be controlled in a predetermined manner.

Another object of our invention is to provide an arc extinguishing unit of the type which forms a pressure-generating arc by the cooperation of an upper contact with an intermediate contact and an interrupting arc by the cooperation of the intermediate with a lower contact such that both said arcs are established substantially simultaneously.

A further object is to transfer the voltage from the line terminal down to the bottom of a single arc extinguishing unit, or down to the bottom of an assemblage of arc extinguishing units, where the potential gradient is relieved by the utilization of a large radius metallic electrostatic shield. This relieves the potential stress in the unit, or through the assemblage, in the open circuit position of the interrupter to minimize corona formation and prevent insulation breakdown.

Another object is to provide an improved arc extinguishing structure having an insulating means defining an elongated arc passage with pairs of fluid passages therein, each pair communicating with said arc passage from opposite sides at one level and the pairs of passages being disposed at spaced intervals along the length thereof and so arranged to direct an enveloping flow of arc extinguishing fluid along spaced longitudinal sections of the arc. Preferably a plurality of relatively restricted venting passages lead from the arc passage at spaced intervals therealong and disposed in staggered relation with respect to said fluid passages to cause intervening sections of the arc to be subjected to a longitudinal flow of arc extinguishing fluid.

Another object is to provide an improved arc extinguishing structure having means of insulating material forming a plurality of annular recesses disposed in longitudinal spaced relation along an elongated arc passage. We provide venting passages of relatively restricted cross-section extending from some of said annular recesses to the exterior of the arc extinguishing structure and we provide fluid flow passages within the arc extinguishing structure, at least two of which communicate with at least one of others of said annular recesses from opposite sides thereof so that a flow of arc extinguishing fluid may be caused to pass through said fluid passages to effect an enveloping longitudinal flow of an extinguishing fluid about at least a portion of the arc.

Another object is to provide an improved arc extinguishing device of the type comprising a stack of contiguously disposed insulating plates forming upon alignment an arc passage with a number of annularly-shaped pockets at spaced intervals along the arc passage. Preferably we provide openings in the plate structure to form a pair of fluid conducting passages at least on opposite sides of the arc passage which communicate with fluid channels to permit the flow of fluid into the arc passage to contact the arc which is established therein. We provide slotted openings in certain of the plates to permit the venting of contaminated fluid away from the arc passage to the exterior of the arc extinguishing device.

Another object is to provide an improved arc extinguishing device including a plurality of stacked plates which collectively form a pressure-generating chamber and an interrupting arc passage with suitable fluid conducting passages from the former to more effectively direct fluid under pressure from the pressure-generating chamber toward the interrupting arc passage to effect the extinction of the interrupting arc drawn thereon.

Further objects and advantages will readily become apparent upon a reading of the following description taken in conjunction with the drawings, in which.

Figure 1:
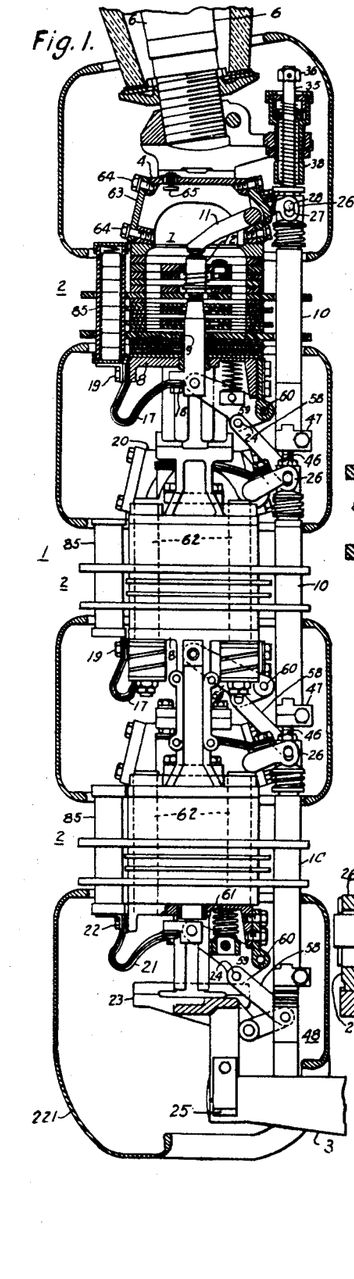
Figure 1 shows an arc extinguishing assemblage in side elevation and partially in section of a preferred embodiment of our invention and shown in the closed-circuit position.

Referring to the drawings and in particular to Fig. 1, the reference numeral 1 designates generally an arc extinguishing assemblage suspended from one line terminal of the circuit interrupter in a suitable tank, not shown, and submerged in a suitable arc extinguishing fluid, such as oil. The arc extinguishing assemblage 1 comprises a plurality of arc extinguishing units generally designated by the reference numeral 2 and serially connected in the closed-circuit position as shown in Fig. 1. A conducting bridging bar 3 serves to connect electrically the arc extinguishing assemblage 1 with an identical assemblage, not shown, in a manner well known in the art.

Figures 2, 3:
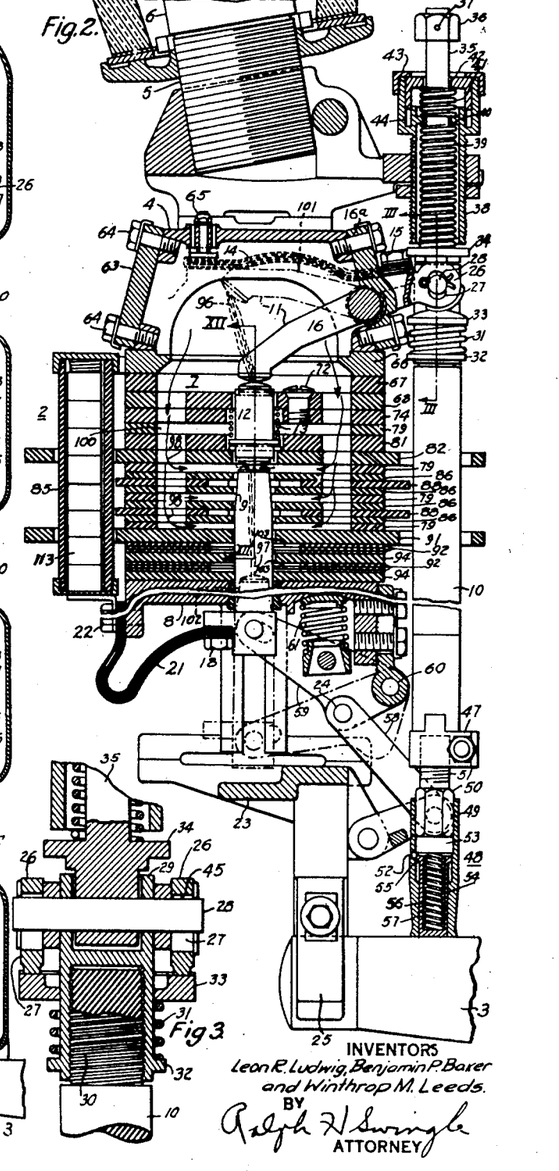
Fig. 2 is an enlarged side-elevational view in section of the top arc extinguishing unit of Fig. 1, with the other arc extinguishing units of Fig. 1 omitted for the purpose of clarity.
Fig. 3 is an enlarged side-elevational view in section of the flexible connection between the operating rod and the upper pressure-generating contact of the arc extinguishing unit of Fig 2, taken on the line III—III of Fig. 2.

Referring more particularly to Fig. 2, it will be observed that the arc extinguishing unit 2 comprises a top casting 4 secured as by a threaded connection 5 to the lead conductor 6 and a plurality of suitable shaped insulating plates pressed together by insulating the tie rods to form an arcing chamber generally designated by the reference numeral 7. Below the insulating plates forming the arcing chamber 7 is a lower casting 8 suitably formed to provide guide means for the lower movable contact 9. Disposed externally of the arc extinguishing unit 2 is an insulating operating rod 10 arranged for longitudinal reciprocating motion to actuate both the upper pressure-generating contact 11 and the lower movable contact 9. An intermediate contact 12 is disposed within the arcing chamber 7 and makes contact with both the lower movable contact 9 and the upper pressure-generating contact 11 in the closed-circuit position. A compression spring 13 biases the intermediate contact 12 downwardly.

Referring more particularly to Fig. 1, it will be observed that the electrical circuit through the circuit interrupter comprises the lead conductor 6, the top casting 4 of the top arc extinguishing unit 2, a flexible conductor 14 (see Fig. 2), one end of which is secured to the top casting 4 and the other end of which is secured by a bolt 15 to an external operating arm 26 of the upper pressure-generating contact 11. The electrical circuit then passes through the upper pressure-generating contact 11 through the intermediate contact 12, the lower movable contact 9 to a flexible conductor 17, one end of which is secured by a bolt 18 to the lower movable contact 9 and the other end of which is secured by the bolt 19 to the lower casting 8. The circuit then passes to the top casting 20 of the intermediate arc extinguishing unit 2 from whence it passes through a flexible conductor 21 which is identical to the flexible conductor 14 previously described. The electrical circuit then passes through the intermediate arc extinguishing unit 2 in a manner identical to its passage through the upper arc extinguishing unit 2. The electrical circuit then passes through the lower arc extinguishing unit 2 to the flexible conductor 21 which is rigidly connected by the bolt 22 to the lower casting 23 of the lower arc extinguishing unit 2. The circuit then passes from the lower casting 23 to contact fingers 25 which are engaged by the conducting bridging bar 3 in the closed-circuit position of the interrupter.

The circuit passes through the conducting bridging bar 3 to a second arc extinguishing assemblage, not shown, but which is preferably identical with the arc extinguishing assemblage 1 shown in Fig. 1.

To open the circuit through the interrupter, the conducting bridging bar 3 is actuated downwardly by suitable operating mechanism, not shown. This downward movement of the conducting bridging bar 3 permits downward movement of the insulating operating rod 10. The insulating operating rod 10 operates both the upper pressure-generating contact 11 and the lower movable contact 9 substantially simultaneously to result in a pressure-generating break being established between the upper pressure-generating contact 11 and the intermediate contact 12, and an interrupting arc being established between the intermediate contact 12 and the lower movable contact 9. Consequently, in each of the three arc extinguishing units 2 a pressure-generating break and an interrupting break are formed, fluid under pressure at the pressure-generating break assisting in the extinction of the interrupting break in a manner to be described more fully hereinafter.

The upper pressure-generating contact 11 is pivotally mounted in the top casting 4 (see Fig. 2) and the external portion of the upper pressure-generating contact 11 comprises two actuating arms 26 (see Fig. 3). The outer ends of the actuating arms 26 have elongated slots 27 through which passes a pin 28 which is rigidly secured to a sleeve 29, the lower end of which is threaded, as at 30, to the upper portion of the operating rod 10. Encircling the sleeve 29 is a compression spring 31, the lower end of which seats on a flange 32 integrally formed with the sleeve 29. The upper end of the compression spring 31 biases a washer member 33 constantly against the lower portions of the actuating arms 26.

The pin 28 also passes through a cap member 34 having an upstanding portion 35, the upper end of which has threadedly secured thereto a nut 36. A rivet 37 passing through the nut 36 secures the nut 36 rigidly to the upstanding portion 35. The upstanding portion 35 passes through a tubular member 38 threadedly secured to the top casting 4, as shown more clearly in Fig 2. A compression spring 39, the upper end of which seats against an internal flange 40, biases the cap member 34 and hence the insulating rod 10 in a downward direction. It is, therefore, apparent that the compression spring 39 biases the contacts 11 and 9 to the open-circuit position. Above the internal flange 40 is a compression spring 41 which biases a sleeve 42 in an upward direction against a cap 43 threadedly secured to the upper portion of the tubular member 38. Consequently, when the bridging bar 3 is moved downwardly rapidly, the nut 36 will strike the sleeve 42, which sleeve will move downwardly in an annular chamber 44 normally filled with oil to cushion the final portion of the opening stroke of the interrupter.

It will be apparent, therefore, that upward movement of the operating rod 10, the washer member 33 being biased upwardly by the compression spring 31, will move the actuating arms 26 upward to result in downward movement of the upper pressure-generating contact 11. When the upper pressure-generating contact 11 has struck the intermediate contact 12, further movement of the pressure generating contact 11 is not permissible. At this point, the elongated slots 27 permit further upward movement of the pin 28, which pin being rigidly secured to the operating rod 10, permits further upward movement of the insulating operating rod 10 compressing the compression spring 31 to provide the desired contact pressure between the upper pressure-generating contact 11 and the intermediate contact 12. However, the insulating operating rod 10 does not move upward to such an extent that the pin 28 strikes the upper end of the slots 27 provided in the actuating arms 26 (see Fig. 3). A slight gap, indicated by the reference numeral 45 in Fig. 3, remains when the closing mechanism has ceased its motion. Thus there is provided a resiliently biased lost-motion connection between the insulating operating rod 10 and the actuating arms 26 which move the pivotally mounted upper pressure-generating contact 11.

Each of the arc extinguishing units 2 is provided with a resilient lost-motion connection between the respective insulating operating rods 10 and the respective actuating arms 26 of the upper pressure-generating contacts 11. Since all of the insulating operating rods 10 are rigidly connected together to move as a unit, the requisite contact pressure is hence provided between each intermediate contact 12 and the upper contact 11. It will be apparent that suitable adjustment may be made with respect to each insulating operating rod 10 by means of the provision of threaded studs 46 (see Fig. 1) which in the case of the lower two arc extinguishing units 2 are secured to the cap members 34. Locking sleeves 47 are provided to make secure the adjustment when once made between the insulating operating rods 10.

When the conducting bridging bar 3 moves downwardly during the opening operation of the interrupter, it will be apparent that the washer members 33 will maintain the contacts 11 in abutting relation with the intermediate contacts 12 until the pin 28 strikes the bottom of the elongated slots 27, at which time the contacts 11 will be pivotally moved in a clockwise direction. The amount of lost motion provided is relatively slight so that in practice the pressure-generating contact 11 and the movable contact 9 separate practically simultaneously from the intermediate contact 12.

To take up the shock of closing, a dashpot, generally designated by the reference numeral 48, is provided at the lower end of the insulating operating rod 10 (see Fig. 2). The dashpot 48 comprises a tubular member 49 rigidly secured by a press fit to a head 50 which is rigidly secured by a threaded connection 51 to the lower insulating operating rod 10. A small aperture 52 is drilled through the side wall of the tubular member 49 just below a rigid plug 53 which is inserted by press fit within the tubular member 49 immediately below the head 50. A piston 54 having an upper external flange 55 is provided and a compression spring 56 biases the piston 54 downwardly. A small aperture 57 drilled through a side wall of the piston 56 permits oil to flow into the interior of the tubular member 49 when the breaker is in the open-circuit position. When the conducting bridging bar 3 moves upward to strike both the fingers 25 and the piston 54, it is moving very fast, of the order of eleven feet per second. Since the operating rod 10 is stationary at this time, it is desirable to cushion the immediate shock which occurs when the conducting bridging bar 3 strikes the piston 54. The cushioning is provided by the oil which is trapped above the piston 54 but which may leave the tubular member 49 through the aperture 52 rather slowly. Consequently, a certain cushioning is provided during the closing operation.

The insulating operating rods 10 are pivotally secured to a plurality of links 58, the other ends of which are pivotally secured to lever members 59 at 24. The lever members 59 are pivotally mounted at pivot points 60. The left-hand ends of the lever members 59, as viewed in Fig. 1, are pivotally secured to the lower moving contacts 9, each of which is guided in its vertical longitudinal motion by suitable guide recesses provided in the lower castings 8. It will, therefore, be apparent that upward movement of the respective insulating rods 10 causes a clockwise rotation of the lever members 59 about the pivot points 60. The lever members 59 are spring-biased in a downward direction by compression springs 61 (see Fig. 1). By varying the distance between the pin 28 and the pivot point 16, and also by varying the distance between the pivot points 24 and 60, any desired ratio of opening speed between the upper contact 11 and the lower contact 9 may be obtained.

The arc extinguishing structure of the interrupter will now be described. Each of the arc extinguishing units 2 comprises a plurality of suitably formed insulating plates pressed together by insulating tie rods 62 (see Fig. 1). Referring particularly to Fig. 2, it will be noticed that the top of the arcing chamber 7 is formed by a dome-shaped top casting 4 made of metal. An inspection plate 63 may be secured to the casting 4 by bolt 64. Consequently, by the loosening of the bolts 64 and the removal of the inspection plate 63, one may view the interior of the arcing chamber 7 without removing any of the parts thereof. A valve 65 may be provided in the casting 4 for the exhaust of gas within the arcing chamber 7 following an opening operation.

Figure 4:
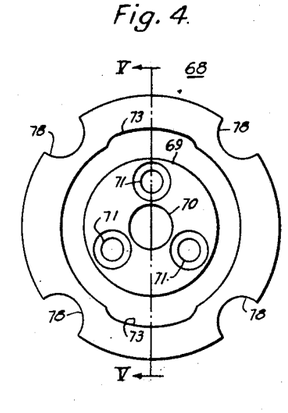
Figs. 4 through 11, inclusive, represent plan and side views in cross section of plate details.
Figure 5:
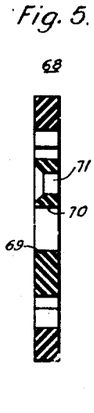
Figure 12:
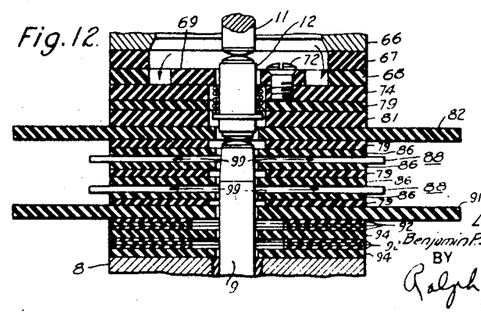
Fig. 12 is an elevational view in cross section taken along the line XII—XII of Fig. 2.

Immediately below the top casting 4 is a ring-shaped metallic plate 66. Immediately below the metallic plate 66 is a second ring-shaped plate 67 of insulating material. Below the plate 67 is an insulating plate 68 more clearly shown in Figs. 4 and 5. It will be noticed that the insulating plate 68 is formed of two separate parts, an inner disk part 69 being concentrically provided within the insulating plate 68. The inner disk plate 69 has a central aperture 70 and three beveled apertures 71 for the reception of screws 72 (see Fig. 12). The insulating plate 68 also has two cutout portions 73 (see Fig. 4).

Figure 6:
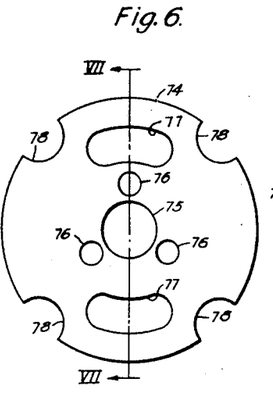
Figure 7:
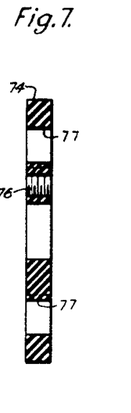

Below the insulating plate 68 is an insulating plate 74, the configuration of which is more clearly shown in Figs. 6 and 7. It will be observed that the insulating plate 74 has a central aperture 75 slightly larger in diameter than the central aperture 70 in the disk plate 69 (see Fig. 4). The insulating plate 74 also has three tapped apertures 76 to accommodate the three screws 72. Also, provided in the insulating plate 74 are two cutout portions 77, the purpose for which will appear more fully hereinafter. Insulating plates 68 and 74 are provided with a plurality of notches 78 to accommodate the insulating tie rods 62.

Figure 8:
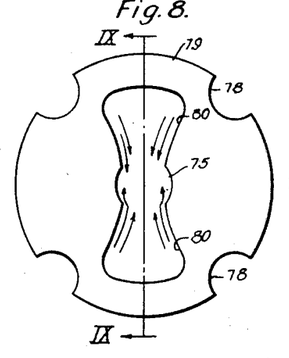
Figure 9:
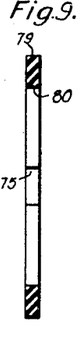

Immediately below the insulating plate 74 is an insulating inlet plate 79, the configuration of which is more clearly shown in Figs. 8 and 9. The insulating inlet plate 79 has a central aperture 75 having substantially the same diameter as the center aperture 75 in the insulating plate 74 (see Fig. 6). Communicating with the central aperture 75 in the insulating inlet plate 79 are two inlet passages 80. Notches 78 for the tie rods 62 are also provided in the insulating inlet plate 79.

Figure 10:
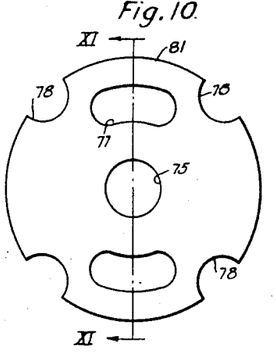
Figure 11:
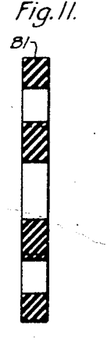

Below the insulating inlet plate 79 is an insulating plate 81, the configuration of which is more clearly shown in Figs. 10 and 11. The insulating plate 81 has notches 78 for the tie rods 62, a central aperture 75 and two cutout portions 77.

Below the insulating plate 81 is an insulating plate 82, the configuration of which is more clearly shown in Figs. 22 and 23. The insulating plate 82 has a central aperture 83 formed therein, four apertures 78 for the insulating tie rods 62, two cutout portions 77, and two apertures 84, through one of which operates the insulating operating rod 10, and through the other of which is disposed a resistor tube 85 (see Fig. 2).

Figures 13, 14:
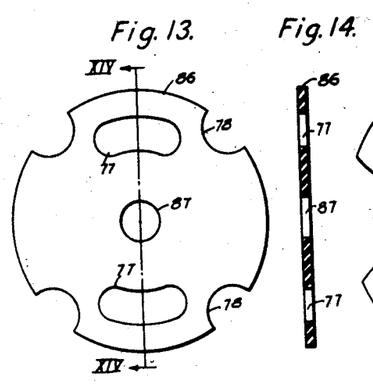
Figs. 13 through 20 show plan and side views in cross section of further plate details.

Below the insulating plate 82 is a second insulating inlet plate 79, which is followed by an insulating orifice plate 86, the configuration of which is more clearly shown in Figs. 13 and 14. It will be noted that the insulating orifice plate contains notches 78 for the tie rods 62, a central aperture 87 which constitutes an orifice through which the interrupting arc is drawn. Also provided in the insulating orifice plate 86 are two cutout portions 77.

Figures 15, 16:
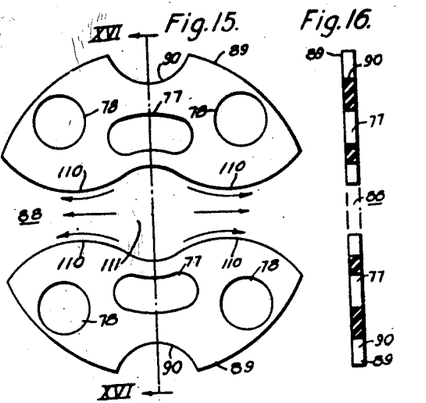

Below the insulating orifice plate 86 is an insulating vent plate generally designated by the reference numeral 88 and more clearly shown in Figs. 15 and 16. The insulating vent plate 88 comprises preferably two identical insulating plates 89, the configuration of which is more clearly shown in Fig. 15. Each of the insulating plates 89 has apertures 78 for the insulating tie rods 62, a cutout portion 77 and a notch 90. One of the notches 90 accommodates the operating rod 10 and the other notch 90 in the other insulating plate 89 accommodates the resistor tube 85.

Below the insulating vent plate 88 is a second orifice plate 86 (see Figs. 13, 14). Below the insulating orifice plate 86 is a third insulating inlet plate 79, which is followed by an orifice plate 86. Then follows a vent plate 88. Immediately below the vent plate 88 is an orifice plate 86. Below the orifice plate 86 is an insulating inlet plate 79 (see Figs. 8 and 9).

Below the insulating plate 79 is an insulating plate 91, the configuration of which is more clearly shown in Figs. 24 and 25. The insulating plate 91 has provided therein four apertures 78 for the insulating tie rods 62, a central aperture 87 of substantially the same diameter as the aperture 87 in the insulating orifice plate 86 (see Fig. 13). Two apertures 84 are provided in the insulating plate 91 which correspond to the apertures 84 in the insulating plate 82 (see Figs. 22 and 23). One of the apertures 84 is used to accommodate the motion of the insulating rod 10 and the other aperture 84 accommodates the resistor tube 85. Below the insulating plate 91 are a plurality, in this instance three, insulating plates 92, the configuration of which is more clearly shown in Figs. 17 and 18. The insulating plate 92 has a central aperture 93 provided therein. Below the three insulating plates 92 is an insulating plate 94, the configuration of which is more clearly shown in Figs. 19 and 20. The insulating plate 94 has a central aperture 95 bored therein and a plurality of notches 78 to accommodate the insulating tie rods 62.

Figure 17:
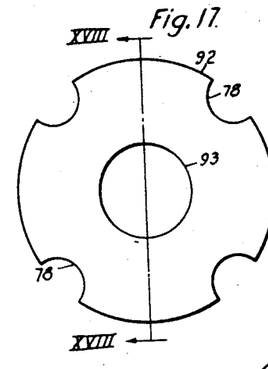
Figures 18, 19, 20:
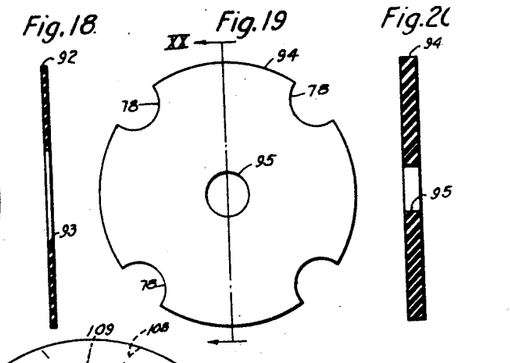

Below the insulating plate 94 are a plurality, in this instance three, insulating plates 92 (see Figs. 17 and 18. Below the three insulating plates 92 is a second insulating plate 94 (see Figs. 19 and 20).

We have found it desirable to rapidly vent ionized products of decomposition resulting from an arc extinguishing fluid impinging upon the arc stream. After an arc extinguishing fluid strikes the arc stream, performing its de-ionizing function by turbulently breaking up and cooling the ionized arc path, contamination of the fluid decreases its usefulness for further extinguishing and insulating purposes. We have, therefore, found it desirable to subject the arc stream to a plurality of radially inflowing streams of arc extinguishing fluid at a number of points along the length of the arc stream rather than to use a single stream to de-ionize a considerable length of arc. At a number of intermediate points along the arc stream, we provide a plurality of vents to allow the contaminated fluid to be rapidly vented radially outward from the arc space.

Preferably the inflowing fluid which strikes the arc stream should strike the arc radially thereof from at least opposite sides to maintain the arc stream in a central position away from adjacently disposed insulating surfaces. If an arc contacts an insulating surface it tends not only to burn away the insulating surface but also to leave carbon thereon which has conducting properties. In the construction of our invention we preferably maintain the arc away from adjacently disposed insulating walls by subjecting at least opposite sides of the arc stream to a radially inward flow of fluid.

When the conducting bridging member 3 is moved downwardly by suitable operating mechanism, not shown, the compression spring 39 (see Fig. 2) biases the insulating operating rods 10 downwardly to effect a practically simultaneous opening movement of the pressure-generating contact 11 with the lower movable contact 9. There results thereby a pressure-generating arc drawn between the pressure-generating contact 11 and the intermediate contact 12, indicated by the dotted line 96 in Fig. 2. The movement of the lower movable contact 9 away from the intermediate contact 12 results in the drawing of an interrupting arc generally designated by the reference numeral 97 in Fig. 2. Fluid, in this instance oil, disposed adjacent to the pressure generating arc 96 will be put under pressure by the generation of gas due to the decomposing action of the high temperature arc, and will be forced to flow toward the interrupting arc 97 which is disposed adjacent to the vent plates 88. The direction of the flow of oil from the pressure generating arc 96 toward the interrupting arc 97 is indicated by the arrows 98 in Fig. 2. The venting of this fluid takes place through the vent plates 88, the direction of the venting being preferably at right angles to the plane of the drawing in Fig. 2. The direction of venting is more clearly shown in Fig. 12, which is a cross-sectional view taken at right angles to the plane of the drawing of Fig. 2. The direction of the venting in the vent plates 88 is indicated by the arrows 99 in Fig. 12.

It will be observed that in the embodiment of our invention shown in Fig. 2, an orifice plate 86 is provided between each insulating inlet plate 79 and each insulating vent plate 88. Consequently, the direction of the inward flow of fluid from the pressure generating arc 96 toward the interrupting arc 97 is changed from a direction substantially transverse to the interrupting arc 97 to a direction substantially longitudinal of the interrupting arc 97 when the fluid flow passes through the orifice plates 86. Therefore, the inward fluid flow must contact the arc as it passes through the central aperture 87 in the orifice plates 86.

We have found that the provision of a plurality of orifice plates 86 disposed between the inlet plates 79 and the vent plates 88 gives rise to very effective conditions for interruption of the interrupting arc 97. It will be apparent that immediately after the inward flowing fluid contacts the arc while passing through the orifice plates 86, it is rapidly vented through the vent plate 88, in an advantageous manner, since its value as an arc extinguishing fluid is greatly decreased after contacting the arc because of its lowered dielectric strength.

It will be observed that the oil flowing from the pressure generating arc 96 toward the interrupting arc 97 will pass through the cutout portions 77 disposed in the insulating plates 74, 81, 86, 89 and 82. The cutout portions 77 thereby provide vertical flow passages designated by the reference numeral 100 in Fig. 2. The open-circuit position of the upper pressure-generating contact 11 is designated by the reference numeral 101. The open-circuit position of the movable contact 9 is designated by the reference numeral 102 in Fig. 2.

From the foregoing description it will be apparent that we have provided an improved arc-extinguishing device consisting of insulating material defining an elongated arc passage within which the interrupting arc 97 is established. We have provided pairs of fluid passages disposed within the arc extinguishing device, as defined by the insulating inlet plates 79. Each pair of fluid passages communicates with the arc passage from opposite sides thereof at one level, and the pairs of fluid passages are disposed at spaced intervals along the length of the arc passage and so arranged to direct an enveloping flow of arc extinguishing fluid along spaced longitudinal sections of the arc. We have provided a plurality of relatively restricted venting passages, as provided by the vent plates 88 leading laterally from the arc passage at spaced intervals therealong and disposed in staggered relation with respect to the entering fluid passages to cause intervening sections of the arc to be subjected to a longitudinal flow of arc extinguishing fluid.

From an analysis of the foregoing arc extinguishing structure, it will furthermore be observed that the inlet plates 79 and the vent plates 88 disposed on opposite sides of the orifice plates 86 provide a plurality of annular recesses disposed in a longitudinal spaced relation along the arc passage. Venting passages of relatively restricted cross section, as defined by the insulating vent plates 88, extend from some of the annular recesses to the exterior of the arc extinguishing unit 2. The fluid flow passages, as defined by the insulating inlet plates 79, communicate in pairs with others of said annular recesses from opposite sides thereof so that the flow of arc extinguishing fluid may take place through the fluid passages to effect an enveloping longitudinal flow of an extinguishing fluid about spaced portions of the arc.

We have found it preferable to provide the foregoing structure from a stack of contiguous plates of insulating material. Certain of the plates, namely the inlet plates 79 and the vent plates 88, have larger openings therethrough than others of said plates to provide a plurality of annularly-shaped pockets at spaced intervals along the arc passage. The plates have other aligned openings therethrough on at least opposite sides of the arc passage to provide the fluid conducting passages 100. It will be observed that certain of the plates having the larger arc passage openings are slotted between the openings forming the vertical flow passages 100 to provide fluid channels to alternate annularly-shaped pockets, and we have designated such plates as the inlet plates 79. Other of the plates forming the stacked arc extinguishing device having the larger arc passage opening are slotted from the arc passage opening to at least two opposed outer edges thereof to provide venting passages from other of said annularly-shaped pockets, and we have designated such plates as the vent plates 88.

It will be noticed that the diameter of the movable contact 9 is not substantially less than the diameter of the orifice 87 provided in the orifice plate 86. By such a construction the fluid is caused to intimately engage the interrupting arc 97 before it is exhausted from the arc extinguishing device 2. It will be noted that the axial length of the portion of the interrupting arc passage between adjacent inlet passages 80 and vent passages is small as compared to the maximum width of the movable contact 9. In other words, as shown in Fig. 2, the orifice portions formed by the orifices 87 of the orifice plates 86 have a short axial length compared to the maximum width of the movable contact 9.

Using an interrupter of the type shown in Fig. 1 for 287 kv. service, we have interrupted 7,000 amperes at 198 kv. to ground with less than one cycle of arcing. Such performance at higher than normal line-to-ground voltage readily shows the effective interrupting conditions attained in the arc-extinguishing units 2. The circuit through the arc-extinguishing assemblages 1 is opened and the arc extinguished prior to the break between the movable conducting bridging bar 3 and the fingers 25 (see Fig. 1). The further motion of the conducting bridging member 3 introduces two isolating gaps in the circuit in the conventional manner. Patent 2,192,722, issued March 5, 1940, to J. B. MacNeill and assigned to the assignee of this application describes and claims broadly such a construction.

The provision of the plurality of insulating plates 92 disposed between the insulating plate 91 and the two insulating plates 94 (see Fig. 2) provides two annular pockets 103 in which fresh oil is disposed to contact the arc if it has not been extinguished before the lower movable contact 9 has passed below the insulating plate 91 in Fig. 2.

Usually, the interrupting arc 97 is extinguished after the moving contact tip has passed one or two of the insulating inlet plates 79.

Figure 21:
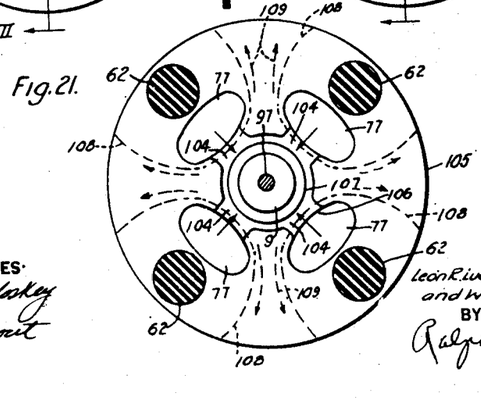
Fig. 21 is a plan view in cross section taken through a modified type of an arc extinguishing unit.

The provision of the arcing chamber 7 made up of the insulating plates previously described gives rise to very effective flow conditions. Preferably, the incoming fluid which contacts the interrupting arc 97 should have a direction which is radially inward toward the interrupting arc 97. Also peferably the venting though the vent plates 88 should take place radially outward from the interrupting arc 97, and in the embodiment of our invention shown in Fig. 2 this flow substantially takes place. However, it will be observed that in Fig. 21, which is a cross-sectional view of a modified type of arc-extinguishing unit 2, four cutout portions 77 are provided which communicate with four inlet passages 104. It will, therefore, be apparent that in Fig. 21 there is a more completely radial inward flow of fluid toward the interrupting arc 97. Immediately below the insulating inlet plate 105 in Fig. 21 is an insulating orifice plate 106, which has the cutout portions 77 formed therein and a central aperture 107 which serves the same purpose as the central aperture 87 in the insulating orifice plate 86 (see Fig. 13). Immediately below the insulating orifice plate 106 in Fig. 21 is an insulating vent plate comprising four insulating portions 108 which are held rigidly in position by the insulating tie rods 62. The flow of fluid in the vent plate of Fig. 21 is as indicated by the arrows 109.

Consequently, in Fig. 21 there is a more completely radial inward and radial venting flow than is provided in the embodiment of our invention shown in Figs. 1 and 2. However, the construction shown in Fig. 21 is more difficult to manufacture commercially and the conditions of flow arising in the embodiment of our invention shown in Fig. 2 approach a radial inward and a radial venting flow sufficiently to bring about very effective interrupting conditions.

The dielectric strength of a fluid is not only a function of the degree of ionization but is also a function of the pressure. Increasing the pressure increases the dielectric strength, and correspondingly lowering the pressure lowers the dielectric strength of the fluid. We have found that if the insulating vent plate 88 of Fig. 15 does not have the projecting portion 110 somewhat restricting the radial outward venting that substantially atmospheric pressure prevails in the portion 111 of Fig. 15. We have consequently found it desirable to increase the pressure at the portion 111 in the vent plate 88 of Fig. 15 by slightly restricting the outward venting, that is, providing the projecting portions 110. The presence of the projecting portion 110 raises the pressure at the center of the vent plates 88 near the point designated by the reference numeral 111 in Fig. 15, and, therefore, increases the effectiveness of the interrupting conditions adjacent the center of the vent plates 88.

We have found that a high pressure peak usually occurs when the pressure generating arc 96 (see Fig. 2) is initially established. This is caused by the fact that fresh oil is immediately adjacent the pressure generating contacts 11, 12, as the arc is first drawn, and is also due to the inertia of the oil as the flow is being started. This initial pressure peak is superimposed on a steadily rising pressure developed by the lengthening arc as the pressure generating contacts continue to open. Consequently by our forming our pressure generating arc 96 substantially at the same time as the formation of the interrupting arc 97 we can take advantage of the high pressure initially formed at the pressure generating arc 96 to drive oil toward the interrupting arc 97 and effect extinction at an early current zero.

It will also be observed that since the operating mechanism permits the attainment of any desired ratio of opening speeds between the contacts 11 and 9 the pressure generating arc 96 may be lengthened at a more rapid rate than the interrupting arc 97 to get an increased pressure effect. This is especially desirable for the rapid interruption of low currents where it is usually difficult to get the requisite pressure for interruption in the first few half-cycles of arcing.

It will also be noted that the pressure generating contact 11 is pivotally mounted adjacent the upper wall of the arc-extinguishing unit 2 in Fig. 2. By a removal of the mounting plate 16a the pressure generating contact 11 may be withdrawn from the arcing chamber 7 without disassembling the unit 2.

During the closing stroke of the interrupter shown in Fig. 2 the lower contact 9 strikes the intermediate contact 12 before the pressure generating contact 11 strikes the intermediate contact 12. Consequently, the lower contact 9 raises the intermediate contact 12 slightly before the pressure generating contact 11 strikes the intermediate contact 12. By this construction the compression spring 31 (see Fig. 3) not only provides the requisite contact pressure between the contacts 11, 12 but also between the interrupting contacts 12, 9. Thus a single biasing means 31 furnishes the contact pressure in the closed circuit position of the interrupter for all the contacts.

In a circuit interrupter of the type having a number of serially related arc-extinguishing structures, the difficulty is encountered, especially on high voltage circuits, that unequal voltage division takes place among the units. In Patent 1,973,460 which issued September 11, 1934, to B. P. Baker and which was assigned to the assignee of this application, the use of resistance is proposed in an interrupter of the type employing two serially related arc-extinguishing units which are connected in the closed-circuit position of the interrupter by a movable conducting bridging bar. The advantages of proper voltage division during opening and closing in a structure of that type is there disclosed. Patent 1,973,485 which issued September 11, 1934, to F. B. Johnson and W. M. Leeds and which was assigned to the assignee of this application, employs capacitance in a similar circuit interrupter for proper voltage division during opening and closing of the interrupter. In Patent 2,185,719, which issued January 2, 1940, to B. P. Baker, and which was assigned to the assignee of this application, the use of tubular capacitance means for controlling the division of voltage across a plurality of serially related breaks is disclosed and the advantages thereof taught. Also, in Patent 2,160,630, which issued May 30, 1939, to R. C. Van Sickle and James M. Cumming, and which was assigned to the assignee of this application, the use of capacitance for properly dividing the voltage between a plurality of serially related arc-extinguishing units of the type shown in our application is described. The present application is also concerned with improvements in the voltage division methods taught in the aforesaid patents.

More specifically, in an arc-extinguishing unit having both a pressure-generating break and an interrupting break, it may be desirable to control the division of voltage across the gaps between the movable pressure-generating contact and the intermediate contact and between the intermediate contact and the lower or interrupting contact. Usually the open-circuit gap between the pressure-generating contacts is less than the open-circuit gap between the interrupting contacts. For example, in an arc-extinguishing unit of the type shown in Fig. 2, the open-circuit gap between the upper movable contact 11 and the intermediate contact 12 is less than the open-circuit gap between the intermediate contact 12 and the lower movable contact 9. Hence during the closing operation the voltage required to break down the pressure-generating gap is less than the voltage required to break down the interrupting gap, and the contacts can be brought nearer to the closed position before breakdown occurs if means is provided for applying voltage to each of the gaps in proportion to their relative dielectric strengths. We propose to control the division of voltage between the pressure-generating contacts and the interrupting contacts by using either resistance or capacitance which may be tapped off to the three contacts, namely, the upper contact 11, the intermediate contact 12 and the lower movable contact 9.

Figure 33:
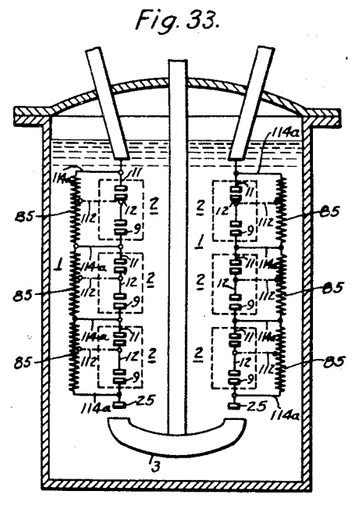
Figs. 33 through 36 show schematically various ways of dividing the voltage between a multiplicity of arc extinguishing units. These figures also show how the recovery voltage transient may be damped and the rate of rise of the recovery voltage transient lowered to prevent restriking.

Referring more particularly to Fig. 33, it will be observed that the conductors 112 are used to tap off approximately one-third of each resistance section 85 across the pressure-generating contacts 11 and 12. Although this connection 112 is not used or shown in Fig. 1, its use in certain applications is desirable to control, during the opening and closing operations of the interrupter, the proper division of voltage within each arc-extinguishing unit 2 as between the pressure-generating contacts 11 and 12 and the interrupting contacts 12 and 9.

The resistor tubes 85 which shunt each arc-extinguishing unit 2 in Figs. 1 and 2 are diagrammatically represented in Fig. 33. The resistor tube 85 comprises a plurality of graphite impregnated blocks 113 disposed together in a serially superimposed relation. Their connection into the interrupter of Fig. 1 is represented by the lines 114a in Fig. 33.

Figure 35:
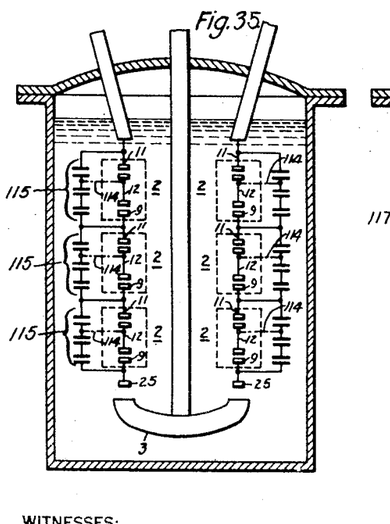

Instead of using resistance to provide the proper division of voltage within each arc-extinguishing unit 2, capacitance may be employed as is shown in Fig. 35. The dotted lines 114 in Fig. 35 show how the taps to the intermediate contacts 12 may be made when capacitor units 115 are used in place of the resistance sections 85. It will be observed that approximately one-third of the voltage impressed across each arc-extinguishing unit 2 during the opening and closing operation is put across the pressure-generating contacts 11 and 12. Of course, a different ratio of voltage division between the pressure generating contacts 11 and 12 and the interrupting contacts 12 and 9 could be used by moving the taps 114 along the capacitor units 115.

Figure 34:
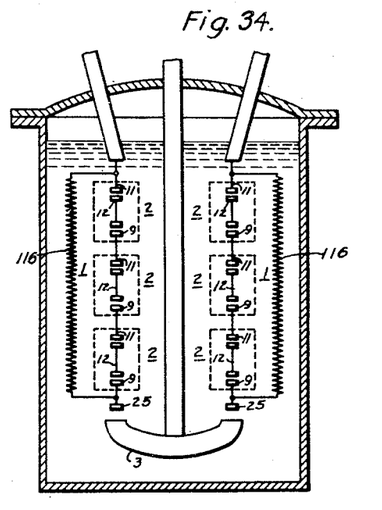
Figure 36:
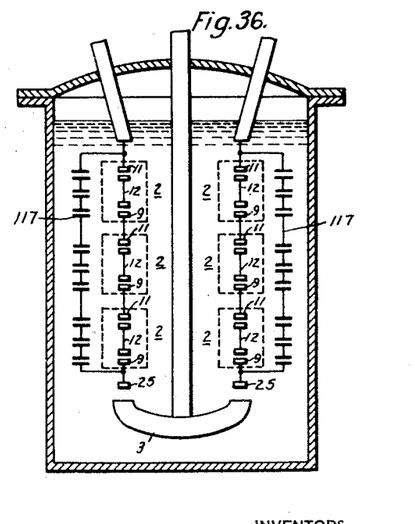

Fig. 34 shows diagrammatically the shunting of resistance sections 116 across each complete arc-extinguishing assemblage 1. Fig. 36 shows the shunting of each arc-extinguishing assemblage 1 with capacitors 117.

The use of the resistance sections 85 in Fig. 33 in place of the capacitance sections 115 in Fig. 35 has the advantage in cost for the same impedance. For the same impedance the resistance sections 85 are much smaller and are more easily mounted. Also, resistance sections 85 of sufficiently low impedance have a damping effect on the recovery voltage transient, particularly effective on interrupting low currents. The resistance sections 85 in Fig. 33 not only change the rate of rise of the recovery voltage transient but also the peak amplitude of the recovery transient. The use of capacitance sections 115 in Fig. 35 has the advantage, however, of providing the proper division of voltage between the arc-extinguishing units 2 independently of the frequency of the recovery transient, since both the disturbing effects and the correcting effects on the voltage division are capacitive. The use of capacitance of sufficiently low impedance can be used to lower appreciably the recovery voltage frequency and thus reduce the rate of rise of the recovery voltage transient.

Figure 37:
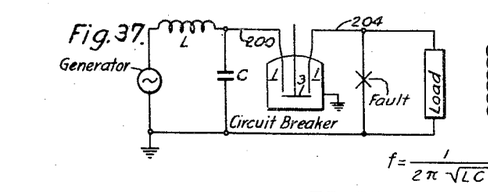
Figs. 37 and 38 are schematic circuit diagrams.

Referring to Fig. 37 we show an alternating current generator controlled by a circuit breaker feeding a reactive load. L indicates the reactance of the generator and C indicates the lumped distributed capacitance in the windings of the generator and between the line 200 and the ground. With the circuit breaker closed (a fault not yet having occurred) a current flows through the load indicated by the sine wave 201 of Fig. 39, the generated voltage being indicated by the sine wave 202 in Fig. 39. Since the load is partly reactive the current 201 lags the generated voltage 202 by a small angle as shown in Fig. 39.

Figure 39:
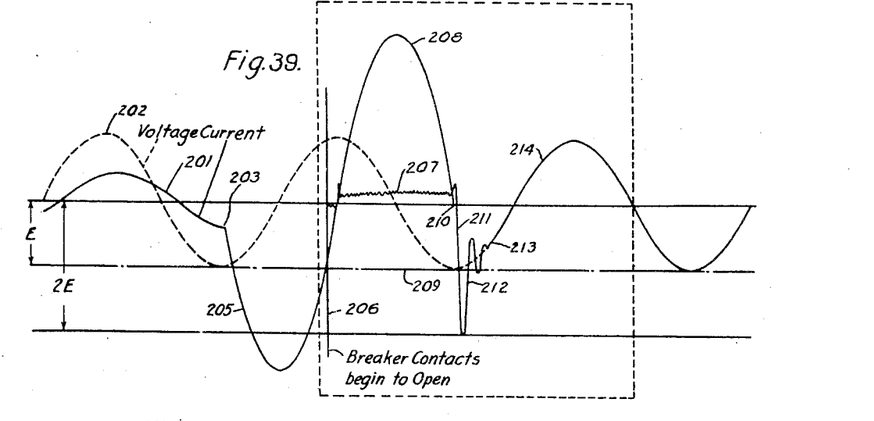
Figs. 39 through 41 are curves showing the relation between the arc voltage, generator voltage and circuit breaker current during circuit interruptions.

Assume at the point 203 in Fig. 39 that a fault occurs, as shown in Fig. 37, the consequence of which is to ground the line 204 of Fig. 37. A large current, limited principally by inductive reactance, will then flow through the circuit breaker, as indicated by the large amplitude sine wave 205 in Fig. 39 with a phase displacement of nearly 90 electrical degrees with respect to the generated voltage. This large fault current 205 will trip the breaker operating mechanism to result in the contacts of the breaker beginning to open at the time 206 in Fig. 39. When the contacts begin to separate, an arc voltage is produced as indicated by the line 207 in Fig. 39. This arc voltage 207 is in phase with the fault current through the breaker indicated by the reference numeral 208 in Fig. 39. The fault current 208 through the breaker continues after the first current zero because the contacts have only slightly separated, and the recovery voltage is sufficient to break down the small contact gap to reestablish a second half cycle of the fault current indicated by the reference numeral 209 in Fig. 39. When the second half cycle 209 of the fault current approaches zero the breaker contacts have separated a sufficient distance so that the recovery voltage transient appearing across the breaker contacts, and indicated by the reference numeral 211 in Fig. 39, is insufficient to break down the contact gap, and the current flow through the breaker contacts is interrupted.

Figure 38:
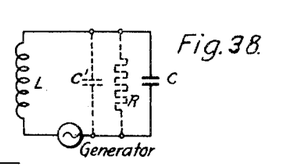

Referring to Fig. 38, which schematically represents Fig. 37 after the fault has occurred, it will be noted that we have an electrical circuit which oscillates upon electrical disturbance with a natural frequency $$f = \frac{1}{2\pi\sqrt{LC}}$$

The capacitance C represents the distributed capacitance of bus, breaker bushings, etc. Consequently in Fig. 39, the recovery voltage transient 211 appearing across the breaker contacts, instead of rising discontinuously to the open circuit generator voltage, tends to overswing to twice the peak value of the generated voltage, as shown, neglecting damping, and oscillates in the portion 212 with a natural frequency given by the above formula. Finally the recovery voltage high frequency transient is damped out by the slight resistance found in any circuit, and the recovery voltage across the breaker contacts settles down to the generated voltage at the point 213. Thereafter the breaker contacts assume the generated voltage 214, as shown.

It will be observed that the high rate of rise of the recovery voltage transient across the breaker contacts, and the fact that in an undamped circuit this transient tends to reach twice the peak amplitude of the generated voltage, all tends to break down the gap between the breaker contacts to result in another half cycle of fault current flowing through the circuit breaker. For purposes of discussion we assumed that the breaker current ceased at the point 210 and that no further fault current flowed through the breaker to show how thereafter the steep rate of rise of the transient recovery voltage and its amplitude tended to break down the contact gap.

Figures 22, 23, 24, 25, 26, 27, 28:
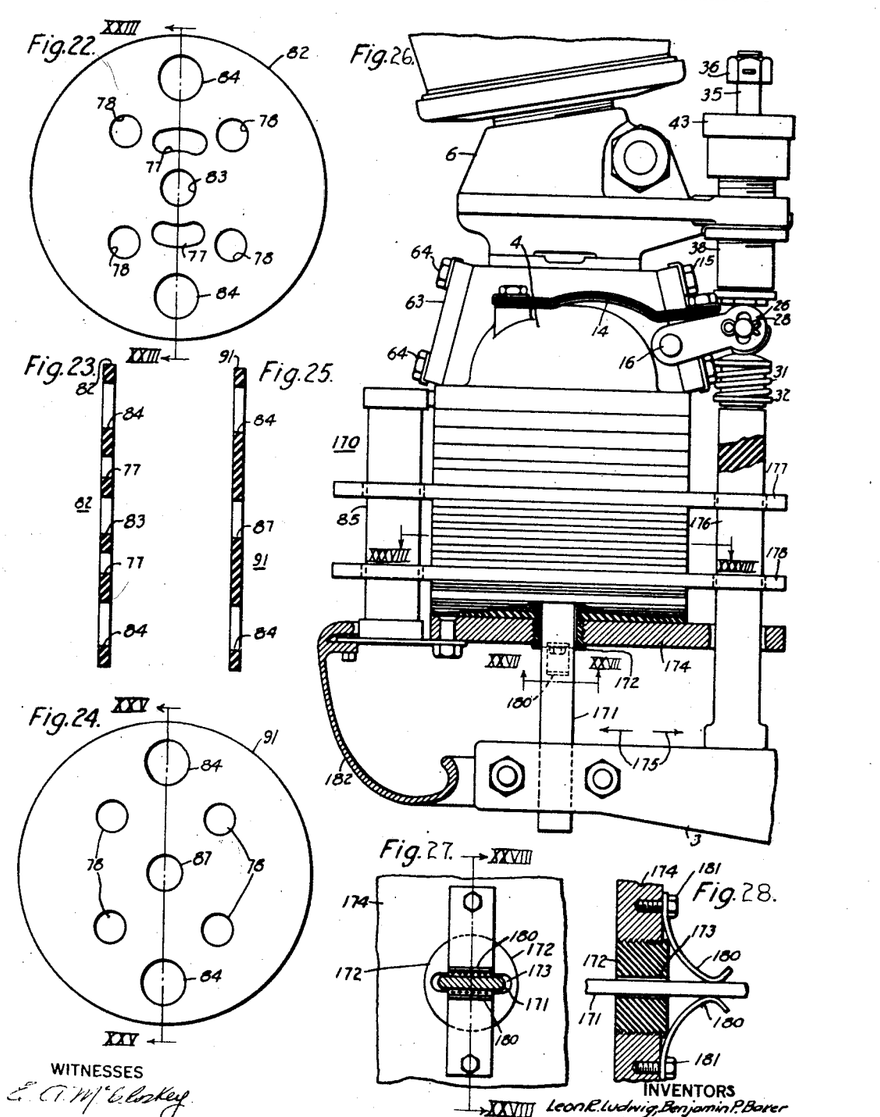
Figs. 22 through 25 show plan and side views in cross section of further plate details.
Fig. 26 shows an application of our invention to a circuit interrupter of the type which contains two arc extinguishing units.
Fig. 27 is a fragmentary view partially in cross section taken on the line XXVII—XXVII of Fig. 26.
Fig. 28 is a plan view in cross section taken on the line XXVIII—XXVIII of Fig. 27.
Figure 40:
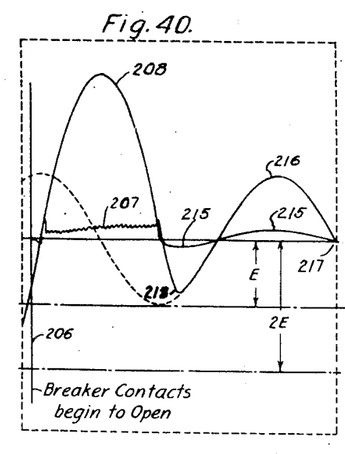

Fig. 40 shows the result of using a resistor 85 (or 116 in Fig. 34) of low impedance value shunting the arc-extinguishing units 2 of Fig. 1, or the unit 170 in Fig. 26, on the recovery voltage transient which appears across the breaker contacts when the current flow is interrupted through the arcing region. A residual current flows through the resistor 85, of course, even after current flow has ceased through the arcing spaces. This residual current is indicated by the reference numeral 215 in Fig. 40, and it will be noted that this residual current 215 through the resistor 85 of low impedance value is in phase with the generated voltage 216 at this time and hence is easy to interrupt at a current zero when the disconnect gap opens at the point 217. The disconnect gap opens in Fig. 1 when the cross bar 3 breaks from the fingers 25, and in Fig. 26 when the lower movable contact 171 breaks from the fingers 180. Also the residual current 215 is low in magnitude as compared with the fault current 208, and hence is easy to interrupt at the point 217 when the disconnect gap opens. The position of the resistor 85 of low impedance value in the circuit is represented by the resistor R in Fig. 38 where it shunts the capacitance C and damps the oscillations of the circuit to lower the rate of rise of the recovery transient and also damps the amplitude of the recovery voltage transient. The combined effect of the low impedance resistor 85 on the recovery voltage transient in lowering the rate of rise and lowering the peak amplitude of the transient is shown by 218 in Fig. 40.

Figure 41:
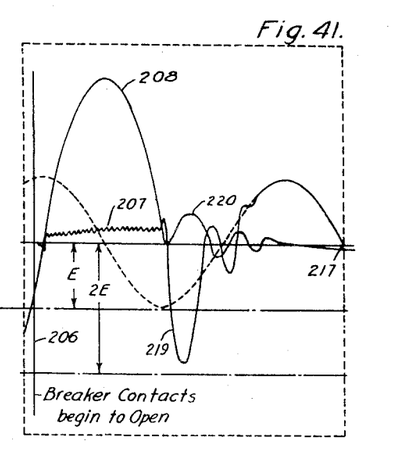

Fig. 41 shows the use of a large shunting capacitance (see 115 in Fig. 35 or 117 in Fig. 36) shunting the breaker contacts to slow the rate of rise of the recovery voltage transient 219 in Fig. 41. The residual current through this capacitance is represented by the curve 220 in Fig. 41 until it is interrupted by the disconnect contacts at 217 in Fig. 41. The capacitance is represented by C' in Fig. 38. In practice it is difficult and expensive to supply a sufficiently large capacitance to slow the rate of rise of the recovery voltage transient, and for this reason the use of a low impedance resistor 85 is considered preferable.

It is within the contemplation of our invention to use a combination of a low impedance resistor 85 with a high capacitance to both slow the rate of rise of the recovery voltage transient and to damp the peak amplitude thereof.

It is obvious that by slowing the rate of rise of the recovery voltage transient appearing across the breaker contacts, and by lowering the peak amplitude thereof there is less chance of the arcing region breaking down to establish another half cycle of fault current flowing through the breaker.

We have found that for a 287 kv. circuit interrupter of the type shown in Fig. 1, that is, one capable of interrupting 7,000 amperes with less than one cycle of arcing using 6 units in series per pole, the most satisfactory numerical value of the resistance 85 shunting each arc-extinguishing unit 2 is approximately 120,000 ohms or a total of 720,000 ohms per pole.

The range of impedance values in ohms, per breaker pole which may be used lies between 500 and 15,000 times the breaker voltage rating in kilovolts. The lower values from 500 to 2500 times the breaker rating are preferable where good voltage distribution must be maintained at high recovery voltage frequencies as well as at low frequencies, justifying the greater size and cost of such impedances. The higher values from 2500 to 15,000 times the breaker rating are more desirable commercially and are adequate for maintaining distribution at frequencies approaching the normal system frequency. Our preferred value of 720,000 ohms per pole at 287 kv. corresponds to 2500 times the voltage and in general we prefer a value between 2000 and 3000 times the voltage. Impedances within the range specified will not serve to damp the recovery voltage transients when interrupting short circuit currents, but may have a slight damping effect when interrupting very low magnetizing or line charging currents. The term "breaker pole" means two of the arc-extinguishing assemblages 1 of Fig. 1, connected in series to interrupt one phase of the circuit. It, of course, also means two of the units 170 in Fig. 26.

Values of impedance below the limits given above shunting the arc-extinguishing units 2 result in more persistent arcing between the movable conducting bridging member 3 and the contact fingers 25 in breaking the residual current through the impedance. Also in using low values of resistance the heat dissipated in the resistance tubes 85 becomes excessive and ample allowance for the dissipation thereof must be provided. For values of impedance shunting the arc-extinguishing units 2 above the limits specified the voltage dividing effectiveness on high frequency recovery voltage transient becomes negligible.

It will be observed in Fig. 1 that we have provided an electrostatic shield 221 supported by, and hence electrically connected with, the lower casting 23. The resistance tubes 85 within the values specified above are of such low impedance that in the open circuit position of the interrupter the lower casting 23 and also the shield 221 are at all times at the same potential as is the line terminal 6. This removes the potential gradient from the top of the arc-extinguishing assemblage 1 to the bottom where the potential gradient into the oil is relieved by the use of the large radius metallic shield 221. Thus in either the completely open or closed positions of the interrupter very little potential stress is placed on the insulating plates making up the individual arc-extinguishing units 2. The transfer of the potential gradient down to the bottom of the assemblage 1 has a further advantage in that the circulation of the oil will remove any decomposed oil caused by the potential stress adjacent to the shield 221. Any lowering of the dielectric strength of the oil adjacent to the shield 221 thus tends to be self-healing.

In the embodiment of our invention shown in Fig. 26 we have applied our invention to a circuit interrupter of the type containing two arc-extinguishing units 170, which are bridged in the closed-circuit position as shown by a conducting bridging member 3. The internal construction of each unit 170 is substantially the same as the unit 2 shown in Fig. 2 except for the differences hereinafter pointed out. Rigidly secured to each end of the bridging member 3 is a lower movable contact 171, which in this instance is preferably of rectangular configuration as shown more clearly in Fig. 27.

An insulating bushing 172 having an elongated slot 173 is threadedly secured to a lower metallic plate 174 of the arc-extinguishing unit 170. It is desirable to reduce gas and fluid leakage out of the unit 170 through the lower slot 173 to maintain the pressure and hence the dielectric strength of the fluid within the unit to a high value. However, it is desirable in practical breaker construction to provide for a certain side play of the conducting bridging member 3 in the direction of the arrows 175. If a circular lower contact is used, the lower aperture in the arc-extinguishing unit will necessarily be so large as to permit considerable leakage out of the unit. On the other hand, by the use of a rectangular contact the extra space required for the side play of the member 3 will be greatly reduced, and leakage through the lower end of the arc-extinguishing unit will be minimized.

An insulating push rod 176, actuated by the conducting bridging member 3, serves to operate the upper pressure-generating contact 11, not shown, in a manner similar to that already explained in connection with Fig. 1. The metallic plate 174 together with the two insulating plates 177, 178 may serve as guides for the push rod 176. In this embodiment of our invention, we arrange lever arms 26 of the pressure-generating contact 11 at such distance from the pivot point 16 that the pressure-generating contact 11, not shown, moves approximately twice as fast as the movement of the lower contact 171. Such increased speed of motion of the pressure-generating contact 11 generates very rapidly a high pressure within the top casting 4 because of the resulting length of the pressure-generating arc 96 (not shown, refer to Fig. 2). This high pressure immediately acts to drive oil toward the interrupting arc 97 and to extinguish the same in a manner described in connection with Fig. 2. Thus the operating means which we use for actuating the contacts of the unit 170 permits any desired ratio of speed of opening between the pressure-generating contact 11 and the lower contact 171. This is especially advantageous in the interruption of low currents where it is usually difficult to obtain quickly the requisite pressure necessary for interruption.

A pair of metallic contact fingers 180, secured by screws 181 to the bottom metallic plate 174, serve to shunt the resistor 85 aross the unit 170 during the opening and closing operation. The resistor 85 has a sufficiently low impedance so that in the open-circuit position the bottom metallic plate 174 and the large radius metallic electrostatic shield 182 have approximately the same potential in either the fully closed or fully open position of the circuit breaker as the lead conductor 6 at the top of the unit 170. The shield prevents corona formation and relieves the potential stress in the oil adjacent thereto. If any oil is decomposed adjacent the shield 182 due to corona from a momentary surge on the transmission line, circulation of the oil removes any possibility of progressive deterioration to the point of breakdown between the unit 170 and the tank wall, not shown. By bringing the potential down to the bottom of the unit 170 in the open circuit position of the interrupter and using the shield 182 to lower the potential gradient in the oil adjacent thereto, practically all potential stress is removed from the insulating plates making up the arc-extinguishing unit 2 except during opening and closing operations of the contacts.

Figure 29:
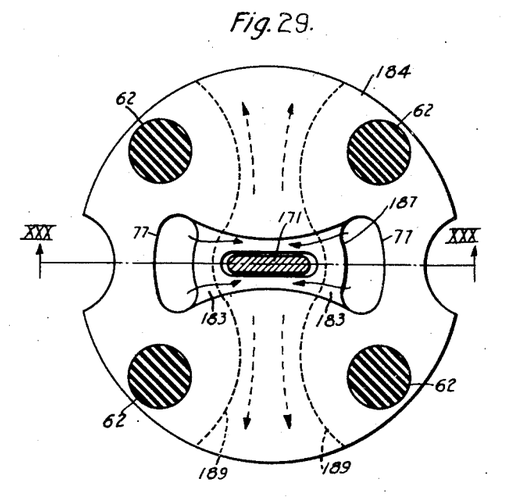
Fig. 29 is a plan view in cross section taken on the line XXIX—XXIX of Fig. 26.
Figure 30:
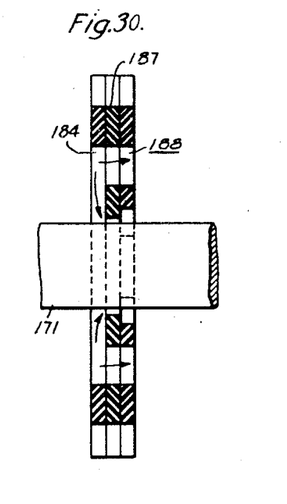
Fig. 30 is a fragmentary side elevational view in cross section taken on the line XXX—XXX of Fig. 29.
Figure 31:
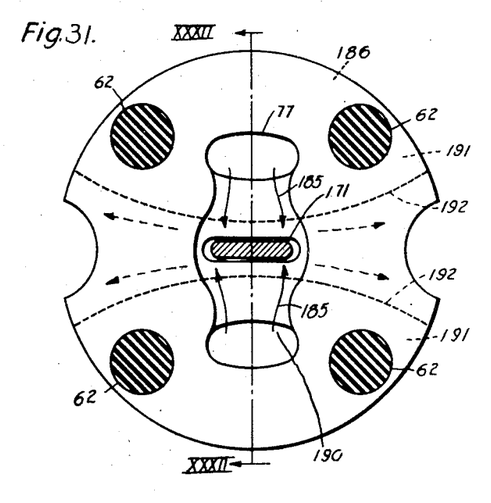
Fig. 31 is a plan view in cross section taken through an arc extinguishing unit similar to the unit shown in Fig. 26.
Figure 32:
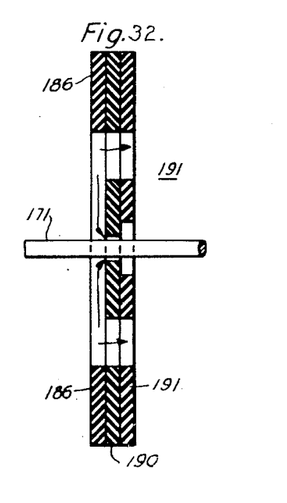
Fig. 32 is a fragmentary side elevational view in cross section taken on the line XXXII—XXXII of Fig. 31.

In Figs. 29 and 30 we have shown the use of the rectangular contact 171 positioned parallel to the inlet passages 183 in the insulating inlet plate 184. An orifice plate 187 separates the insulating inlet plate 184 in Fig. 29 from an insulating vent plate 188, which is preferably formed of two identical parts 189. An alternate arrangement is shown in Figs. 31 and 32 in which the contact 171 is positioned transverse to the inlet passages 185 of the insulating inlet plate 186 in Fig. 31. In Figs. 31 and 32 an insulating orifice place 190 is positioned between the inlet plate 186 and the insulating vent plate 191, which is also preferably formed of two identical parts 192. Tie rods 62 serve to hold the insulating plates in position.

The lower part of the arc-extinguishing unit 170 in Fig. 26 contains a plurality of groups of insulating plates, each group consisting of the three plates shown in Figs. 29 and 30. The extinguishing action is similar to that already described in connection with Fig. 2. In certain applications it is desirable to use in place of the groups shown in Figs. 29 and 30 the groups shown in Figs. 31 and 32. Each group has its advantages, the group in Figs. 29 and 30 having facilitated venting as a result of the construction shown. The group in Figs. 31 and 32 provides particularly effective flow toward the arc. Both constructions minimize leakage through the bottome of the arc-extinguishing unit 170 in Fig. 26.

In the constructions set forth in Figs. 29–32, it will be observed that the arc passage through which the interrupting arc 97 is drawn is of generally rectangular cross section, the fluid inlet passages leading to the arc passage being either parallel to the broad side of the rectangularly-shaped arc passage as shown in Figs. 29 and 30, or they are in a direction generally perpendicular to the broad side of the arc passage of generally rectangular cross section as set forth in Figs. 31 and 32.

It will be apparent from the foregoing description of certain embodiments of our invention that we have provided a novel arc-extinguishing structure which employs arc-extinguishing fluid to secure the maximum benefits thereof. The scope of the invention is broad and by our describing it in connection with circuit interrupters of the liquid break type, we do not intend to limit its applicability only to those types.

Although we have illustrated specific embodiments, it will be clearly understood that the same were merely for purposes of illustration and that changes and modifications may be made therein by those skilled in the art without departing from the spirit and scope of the appended claims.

We claim as our invention:

1. In a circuit interrupter, arc extinguishing means including a stack of contiguous plates of insulating material, said plates having aligned openings therethrough to form an arc passage, separable contact means for establishing an arc in said passage at least two of said plates having larger openings therethrough than others to provide a plurality of annularly-shaped pockets at spaced intervals along the arc passage, said plates having other aligned openings therethrough on at least opposite sides of said arc passage to provide fluid conducting passages, one or more of said plates having the larger arc passage opening being slotted between openings to provide fluid channels to at least one of said annularly-shaped pockets, one or more of said plates having the larger arc passage opening being slotted from the arc passage opening to at least two opposed outer edges thereof to provide venting passages from at least one other of said annular pockets.

2. In a circuit interrupter, arc extinguishing means including a stack of plates of insulating material, said plates having aligned holes therethrough to form an arc passage, the holes in three or more of said plates being of different dimensions and the plates so arranged to provide at least three annular pockets at predetermined intervals along said passage, separable contacts for establishing an arc within said passage, at least one of said contacts being movable and of dimensions not substantially less than the smaller holes in said plates through which said one contact is movable, said plates having additional aligned holes therethrough positioned on at least opposite sides of said arc passage to provide fluid conducting passages, one or more of said plates with the larger arc passage hole having cut out portions joining the respective openings to provide fluid conducting channels to one or more of said annular pockets, two or more of said plates with the larger arc passage hole having cut out portions extending laterally from the arc passage hole to at least two opposed outer edges thereof to provide laterally extending vent passages from some of the other of said annular pockets, and means for forcing a quantity of arc extinguishing fluid into said fluid conducting passages to cause said fluid to flow radially within the respective annular pockets into engagement with the arc then longitudinally thereof in opposite directions into the next adjacent annular pockets and finally with the products of decomposition of the arc in a direction radially away from the arc through said vent passages.

3. In a circuit interrupter, means for establishing an arc, means including a plurality of contiguously disposed insulating plates for defining a substantially enclosed arc passage of insulating material closely confining the arc along a major portion of its length, one of the insulating plates being an orifice plate providing an insulating orifice within the arc passage, an insulating inlet plate disposed on one side of the orifice and providing a pair of diametrically positioned inlet passages on one level so that an incoming flow of fluid may pass through the inlet passages inwardly toward the arc substantially transversely thereto on opposite sides thereof, and a venting plate having a venting passage therein positioned on the opposite side of the orifice permitting relatively restricted venting of the fluid.

4. In a circuit interrupter, a container having arc extinguishing fluid therein, an arc extinguishing unit immersed in said fluid, said unit comprising means at least partially of insulating material defining a pressure chamber, a stack of plates of insulating material pressed together and disposed adjacent to said pressure chamber, said plates having aligned openings therethrough to provide an elongated arc passage, the opening in at least one of said plates intermediate the ends of said stack having dimensions smaller than those in others of said plates to form an orifice, at least one of said plates having openings therein forming at least two inlet passages extending from said pressure chamber to said arc passage and leading into said arc passage on one side of said orifice from opposed sides of the passage in the same plane, at least another of said plates disposed on the other side of said orifice defining at least two relatively restricted vent passages leading away from said arc passage, means for establishing an arc in said arc passage which plays through said orifice, and means for establishing a pressure-generating arc in said pressure chamber to force arc extinguishing fluid through said inlet passages into engagement with the arc and subject the arc portion in said orifice and between said inlet and vent passages to a longitudinal blast of arc extinguishing fluid.

5. In a circuit interrupter, a pair of serially related arc extinguishing assemblages, each assemblage comprising one or more arc extinguishing units, means for electrically interconnecting the assemblages in the closed circuit position of the interrupter, and impedance means totaling for each pole of the interrupter a value in ohms less than 500 times the breaker voltage rating in kilovolts shunting each assemblage to slow the rate of rise of the recovery voltage transient and lower the peak value thereof across the assemblages during the opening operation.

6. In one pole of a circuit interrupter, two arc extinguishing assemblages, each assemblage comprising one or more arc extinguishing units, and impedance means for having the potential at the bottom of the assemblage substantially the same as the potential at the top of the assemblage in the open circuit position of the interrupter and for dividing the voltage between the two assemblages, the impedance means totaling for the pole a value in ohms which falls within the range between 500 and 15,000 times the breaker voltage rating in kilovolts.

7. In one pole of a circuit interrupter, two arc extinguishing assemblages, each assemblage comprising one or more arc extinguishing units, and impedance means for having the potential at the bottom of the assemblage substantially the same as the potential at the top of the assemblage in the open circuit position of the interrupter and for dividing the voltage between the two assemblages, the impedance means totaling for the pole a value in ohms which falls within the range between 500 and 2,500 times the breaker voltage rating in kilovolts.

8. In one pole of a circuit interrupter, two arc extinguishing assemblages, each assemblage comprising one or more arc extinguishing units, and impedance means for having the potential at the bottom of the assemblage substantially the same as the potential at the top of the assemblage in the open circuit position of the interrupter and for dividing the voltage between the two assemblages, the impedance means totaling for the pole a value in ohms which falls within the range between 2,500 and 15,000 times the breaker voltage rating in kilovolts.

9. In one pole of a circuit interrupter, two arc extinguishing assemblages, each assemblage comprising one or more arc extinguishing units, and impedance means for having the potential at the bottom of the assemblage substantially the same as the potential at the top of the assemblage in the open circuit position of the interrupter and for dividing the voltage between the two assemblages, the impedance means totaling for the pole a value in ohms which falls within the range between 2,000 and 3,000 times the breaker voltage rating in kilovolts.

10. In a circuit interrupter, an arc extinguishing unit comprising a plurality of insulating plates pressed together, means for establishing a pressure-generating arc adjacent one end of the unit, means for establishing an interrupting arc adjacent the other end of the unit, the plates forming an elongated substantially enclosed insulating arc passage closely confining the interrupting arc along a major portion of its length, certain plates forming pairs of communicating inlet passages which lead into the arc passage at at least two levels past which the interrupting arc is elongated, other plates forming pairs of communicating vent passages at at least two intermediate levels leading out of the arc passage, and the pressure-generating arc forcing fluid through the inlet passages into the arc passage adjacent the interrupting arc and out of the arc passage through the vent passages.

11. In a circuit interrupter, two arc extinguishing assemblages, each assemblage comprising a plurality of arc extinguishing units, means for connecting the assemblages in the closed circuit position, and resistance means totaling for each pole of the interrupter a value in ohms less than 500 times the breaker voltage rating in kilovolts shunting each assemblage to control the rate of rise of the recovery voltage transient and lower the peak value thereof during the opening operation.

12. The combination in a circuit interrupter for interrupting a wide range of currents of a pair of serially related arc extinguishing assemblages, each assemblage including one or more serially connected breaks, means for electrically interconnecting the assemblages in the closed circuit position of the interrupter, and impedance means totaling for each pole of the interrupter a value in ohms less than 500 times the breaker voltage rating in kilovolts, the impedance means being divided so that one of the two portions thereof shunts each assemblage to slow the rate of rise of the recovery voltage transient and lower the peak value thereof across the assemblages during the opening operation.

13. In a relatively high voltage circuit interrupter, the combination of a pair of serially related arc extinguishing assemblages, each assemblage including one or more serially connected breaks, disconnect means for electrically interconnecting the assemblages in the closed circuit position of the interrupter, and impedance means of low enough value shunting each assemblage to slow the rate of rise of the recovery voltage transient and lower the peak value thereof across the assemblages during the opening operation, the impedance means totaling for each pole of the interrupter a value in ohms which is less than 500 times the breaker voltage rating in kilovolts.

14. A circuit interrupter including an arc extinguishing unit comprising a plurality of insulating plates pressed together, means for establishing a pressure-generating arc adjacent one end of the unit, means for establishing an interrupting arc adjacent the other end of the unit, the plates forming an elongated substantially enclosed insulating arc passage closely confining the interrupting arc along a major portion of its length, certain plates forming pairs of communicating inlet passages which lead into the arc passage at at least two levels past which the interrupting arc is elongated, other plates forming vent passages at at least two intermediate levels leading out of the arc passage, and the pressure-generating arc forcing fluid through the inlet passages into the arc passage adjacent the interrupting arc and out of the arc passage through the vent passages.

15. A circuit interrupter of the liquid break type including a body of liquid, means at least partly of insulating material forming an arc extinguishing unit having a pressure-generating chamber, means supporting the arc extinguishing unit within the liquid, means for establishing a pressure-generating arc within the pressure-generating chamber adjacent one end of the unit, means including a movable contact for establishing an interrupting arc adjacent the other end of the unit, the arc extinguishing unit having an elongated substantially enclosed insulating arc passage closely confining the interrupting arc along a major portion of its length, said arc passage having pairs of communicating inlet passages which lead into the arc passage at at least two levels past which the interrupting arc is elongated, a plurality of vent passages staggered with respect to the inlet passages and disposed at at least two different levels and leading out of the arc passage, passage means extending from the pressure-generating chamber to the inlet passages, the pressure-generating arc forcing liquid through the passage means and through the inlet passages into the arc passage against the interrupting arc and out of the arc passage through the vent passages into the body of liquid, and the axial length of the portion of the arc passage between adjacent inlet and vent passages being small as compared to the maximum width of the movable contact.

16. A circuit interrupter of the liquid break type including a body of liquid, means at least partly of insulating material forming an arc extinguishing unit, means supporting the arc extinguishing unit within the liquid, means for establishinng an arc within the unit including a relatively movable contact, said arc extinguishing unit having a substantially enclosed arc passage of insulating material closely confining the arc along a major portion of its length, said arc passage having a plurality of orifice portions of short axial length compared to the maximum width of the movable contact disposed at intervals along the arc passage intermediate the ends thereof, said arc passage having a plurality of inlet passages so that in incoming flow of liquid may pass through the inlet passages inwardly toward the arc substantially transversely thereto, a plurality of venting passages extending from the arc passage staggered between the inlet passages and permitting relatively restricted venting of the liquid, one of said orifice portions being between each inlet and venting passage, and means for forcing the liquid to flow through the inlet passages into the arc passage and through the orifice portions and out through the venting passages into the body of liquid.

17. A circuit interrupter of the liquid break type including a body of liquid, means at least partly of insulating material forming an arc extinguishing unit, means supporting the arc extinguishing unit within the liquid, means for establishing an arc within the unit including a relatively movable contact, said arc extinguishing unit having a substantially enclosed arc passage of insulating material closely confining the arc along a major portion of its length, said arc passage having a plurality of orifice portions of short axial length compared to the maximum width of the movable contact disposed at intervals along the arc passage intermediate the ends thereof, said arc passage having a plurality of diametrically positioned inlet passages on one level on one side of each of the orifice portions so that an incoming flow of liquid may pass through the inlet passages inwardly toward the arc substantially transversely thereto on opposite sides thereof, a plurality of venting passages extending from the arc passage staggered between the inlet passages and permitting relatively restricted venting of the liquid, one of said orifice portions being between each inlet and venting passage, and means for forcing the liquid to flow through the inlet passages into the arc passage and through the orifice portions and out through the venting passages into the body of liquid.

18. A circuit interrupter of the liquid break type including a body of liquid, means at least partly of insulating material forming an arc extinguishing unit having a pressure-generating chamber, means supporting the arc extinguishing unit within the liquid, means for establishing a pressure-generating arc within the pressure-generating chamber, means for establishing an interrupting arc within the unit including a movable contact, said arc extinguishing unit having a substantially enclosed arc passage of insulating material closely confining the interrupting arc along a major portion of its length, said arc passage having a plurality of orifice portions of short axial length compared to the maximum width of the movable contact disposed at intervals along the arc passage intermediate the ends thereof, said arc passage having a plurality of inlet passages so that an incoming flow of liquid may pass through the inlet passages inwardly toward the arc substantially transversely thereto, a plurality of venting passages extending from the arc passage staggered between the inlet passages and permitting relatively restricted venting of the liquid, one of said orifice portions being between each inlet and venting passage, passage means extending from the pressure-generating chamber to the inlet passages so that the pressure-generating arc may force liquid out of the pressure-generating chamber through the passage means and the inlet passages into the arc passage and through the orifice portions to exhaust out through the venting passages into the body of liquid.

LEON R. LUDWIG.
BENJAMIN P. BAKER.
WINTHROP M. LEEDS.

REFERENCES CITED

The following references are of record in the file of this patent:

UNITED STATES PATENTS

| Number | Name | Date |
|---|---|---|
| 1,899,612 | Dyer | Feb. 28, 1933 |
| 1,922,862 | Prince | Aug. 15, 1933 |
| 1,973,485 | Johnson et al. | Sept. 11, 1934 |
| 2,061,945 | Koppelmann et al. | Nov. 24, 1936 |
| 2,160,630 | Van Sickle et al. | May 30, 1939 |
| 2,279,536 | Thommen | Apr. 14, 1942 |
| 2,391,672 | Boehne et al. | Dec. 25, 1945 |

FOREIGN PATENTS

| Number | Country | Date |
|---|---|---|
| 486,050 | Great Britain | May 30, 1938 |